(12) United States Patent
Li et al.

(10) Patent No.: US 7,713,428 B2
(45) Date of Patent: May 11, 2010

(54) METHOD OF FABRICATING POLYMER MODULATORS WITH ETCH STOP CLADS

(75) Inventors: Bing Li, Bothell, WA (US); Danliang Jin, Bothell, WA (US); Raluca Dinu, Redmond, WA (US); Guomin Yu, Bothell, WA (US)

(73) Assignee: GigOptix, Inc., Bothwell, WA (US)

( * ) Notice: Subject to any disclaimer, the term of this patent is extended or adjusted under 35 U.S.C. 154(b) by 521 days.

(21) Appl. No.: 11/753,052

(22) Filed: May 24, 2007

(65) Prior Publication Data

US 2008/0290066 A1 Nov. 27, 2008

(51) Int. Cl.
*B29D 11/00* (2006.01)
(52) U.S. Cl. .......................................... 216/24; 216/67
(58) Field of Classification Search ............... 216/24, 216/67
See application file for complete search history.

(56) References Cited

U.S. PATENT DOCUMENTS

| | | | |
|---|---|---|---|
| 5,659,646 A | 8/1997 | Vinchant et al. | |
| 6,716,995 B2 | 4/2004 | Huang et al. | |
| 6,750,603 B2 | 6/2004 | Huang et al. | |
| 6,895,162 B2 | 5/2005 | Bintz et al. | |
| 7,019,453 B2 | 3/2006 | Huang et al. | |
| 7,101,957 B2 | 9/2006 | Huang et al. | |
| 7,144,960 B2 | 12/2006 | Jen et al. | |
| 2006/0049387 A1 | 3/2006 | Huang | |

OTHER PUBLICATIONS

Enami et al., "Hybrid electro-optic polymer/sol-gel waveguide modulator fabricated by all-wet etching process," *Appl. Phys. Lett.*, 2003, 83:4692-4694.
Chang et al., "Vertical adiabatic transition between a silica planar waveguide and an electro-optic polymer fabricated with gray-scalelithography," *Opt. Lett.*, 2003, 28:869-871.
Oh et al., "Recent advances in electooptic polymer modulators incorporating highly nonlinear chromophore," *IEEE J. Sel. Top. Quant. Electron.*, 2001, 7:826.
Kim et al., "Electrooptic polymer modulators with an inverted-rib waveguide structure," *IEEE Phot. Technol. Lett.*, 2003, 15:218-220.

*Primary Examiner*—Roberts Culbert
(74) *Attorney, Agent, or Firm*—Graybeal Jackson LLP

(57) ABSTRACT

A process that comprises dry etching a trench into a side clad polymer layer using an underlying passive polymer layer as an etch stop, and then back filling the trench with an electro-optic polymer.

15 Claims, 5 Drawing Sheets

METHOD OF FABRICATING POLYMER MODULATORS WITH ETCH STOP CLADS

BACKGROUND

All patents, patent applications, and publications cited within this application are incorporated herein by reference to the same extent as if each individual patent, patent application or publication was specifically and individually incorporated by reference.

Electro-optic polymer modulators have been researched for use in RF photonics and telecommunication. Such polymer modulators may be fabricated by wet etching a trench into a single polymer layer and back filling the trench with an electro-optic polymer. However, the final devices suffer because the etch solution or gas etchant leave the bottom of the trench rough, which results in increased optical loss. Additionally, the depth of the trench is often difficult to control and reproduce because the etching rate depends strongly on both precise etchant composition and etch times.

SUMMARY

One embodiment is a device, comprising: a) a passive polymer layer having an inverted-rib; b) a first side clad and a second side clad separated by the inverted rib; c) a third side clad and a fourth side clad separated by an electro-optic polymer channel, wherein third side clad, fourth side clad, and electro-optic polymer channel overly passive polymer layer; and d) a first clad polymer layer overlying the third side clad, fourth side clad, and electro-optic polymer channel, wherein the electro-optic polymer channel, the third side clad, and the fourth side clad are coplanar with each other and have approximately the same thickness, and wherein the electro-optic polymer channel is substantially vertically aligned with the inverted rib. Both the inverted-rib and the electro-optic polymer channel function as optical waveguides, with light propagating perpendicular to the plane of the cross section of the stacked layer. Another embodiment is a device further comprising: e) a first electrode underlying the first side clad, the second side clad, and the inverted rib; h) a second clad polymer layer underlying the first electrode; and i) a second electrode overlying the first clad polymer layer and substantially vertically aligned with the electro-optic channel. The second clad polymer layer may be an organically modified silicate.

One embodiment is a process that comprises dry etching a trench into a side clad polymer layer using an underlying passive polymer layer as an etch stop, and then back filling the trench with an electro-optic polymer. By using this process, the bottom of the trench is smooth, which reduces optical loss in the device. Additionally, the process is much less sensitive to etch gas composition and etch time, which increases fabrication repeatability. In some embodiments, the side clad polymer layer may be a crosslinked organic polymer and the passive polymer layer may be an organically modified silicate.

DETAILED DESCRIPTION

Figure 1:
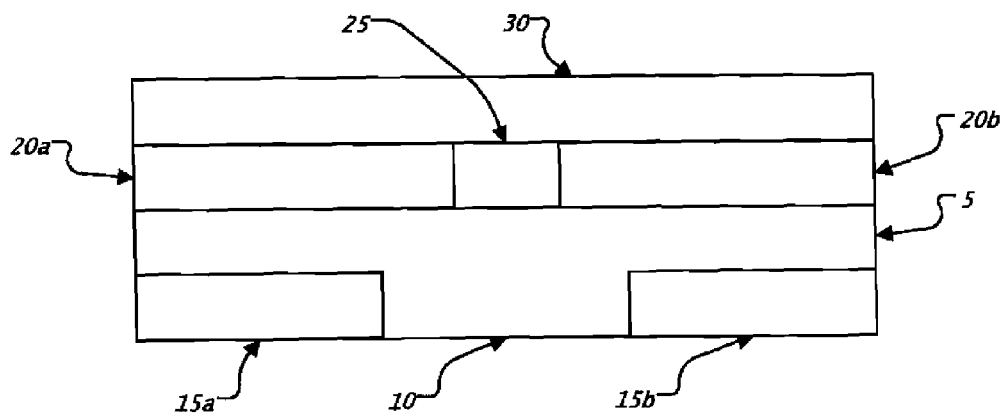
FIG. 1 illustrates a device embodiment.

Referring to the cross-sectional view show in FIG. 1, one embodiment is a device, comprising: a) a passive polymer layer 5 having an inverted-rib 10; b) a first side clad 15a and a second side clad 15b separated by the inverted rib 10; c) a third side clad 20a and a fourth side clad 20b separated by an electro-optic polymer channel 25, wherein third side clad 20a, fourth side clad 20b, and electro-optic polymer channel 25 overly passive polymer layer 5; and d) a first clad polymer layer 30 overlying the third side clad 20a, fourth side clad 20b, and electro-optic polymer channel 25, wherein the electro-optic polymer channel 25, the third side clad 20a, and the fourth side clad 20b are coplanar with each other and have approximately the same thickness, and wherein the electro-optic polymer channel 25 is substantially vertically aligned with the inverted rib 10. Both the inverted-rib 10 and the electro-optic polymer channel 25 function as optical waveguides, with light propagating perpendicular to the plane of the cross section shown in FIG. 1. In the active region of a device the electro-optic polymer channel 25 functions as the waveguide core and the passive polymer layer 5 functions as a clad. In passive regions of the device, the inverted rib 10 functions as the waveguide core. A vertical transition of an optical mode from a first waveguide core to a second waveguide core can be accomplished by tapering portions of the first waveguide core, portions of the second waveguide core, portions of any of the clads or any combination thereof, for example see Y. Enami et al., *App. Phys. Lett.* 83, 4692, 2003; D. H. Chang et al., *Opt. Lett.* 28, 869, 2003, and U.S. Pat. No. 5,659,646. Thus, the vertical transition from inverted rib 10 to electro-optic polymer channel 25 can be accomplished by tapering portions of electro-optic polymer channel 25, portions of inverted rib 10, portions of passive polymer layer 5, portions of any of the clads, or any combination thereof.

In another embodiment, the passive polymer layer 5 comprises an organically modified silicate. Organically modified silicates are also known as, for example, "sol-gels" or "organically modified ceramics." The organically modified silicate may comprise an acrylate group and a refractive index modifying group. The index modifying group may be any polarizable group that increases the refractive index of the cured organically modified silicate such as aromatic groups or metal atoms such as titanium or zirconium. The index modifying group may also be a group that decreases the refractive index of the organically modified silicate such as a fluorinated alkyl group. The refractive index of the organically modified silicate may be adjusted by increasing or decreasing the concentration of the index modifying group. The acrylate group may provide a means of photocuring the organically modified silicate to improve mechanical properties before thermal curing.

The first side clad 15a, the second side clad 15b, the third side clad 20a, and the fourth side clad 20b may each independently comprise a crosslinked polymer. The crosslinked polymers provide solvent resistance to photoresist solvents and polymer layer solvents during fabrication of the device. In one embodiment, the first side clad 15a, the second side clad 15b, the third side clad 20a, and the fourth side clad 20b each independently comprises a crosslinked acrylate comprising a poly(alkylene glycol). Examples of a poly(alkylene glycol) include poly(ethylene glycol) and poly(propylene glycol). In another embodiment, the acrylate comprising a poly(alkylene glycol) further comprises pentaerythritol tetraacrylate.

The electro-optic polymer channel 25 comprises at least one chromophore in a polymer matrix. The chromophore comprises at least one electron donor that is electronically π-conjugated with at least one electron acceptor in a "push-pull" configuration. The push-pull electron configuration results in a large dipole moment for the chromophore. Typically, the chromophore and polymer matrix are isotropic when combined and must be poled with an electric field to induce electro-optic activity. The polymer matrix may include polyacrylates, poly(arylene ethers), polycarbonates, polyimides, or copolymers thereof. The chromophore may be a guest in the polymer matrix, a side chain constituent of the polymer matrix, or crosslinked into the polymer matrix. The chromophore may further comprise alkyl groups (e.g., dendrons) that disrupt intermolecular electrostatic interaction between chromophore dipoles. For examples of electro-optic polymers see: U.S. Pat. Nos. 7,144,960; 7,101,957; 7,019,453; 6,750,603; and 6,716,995 and US Pat Pub 20060049387.

Figure 2:
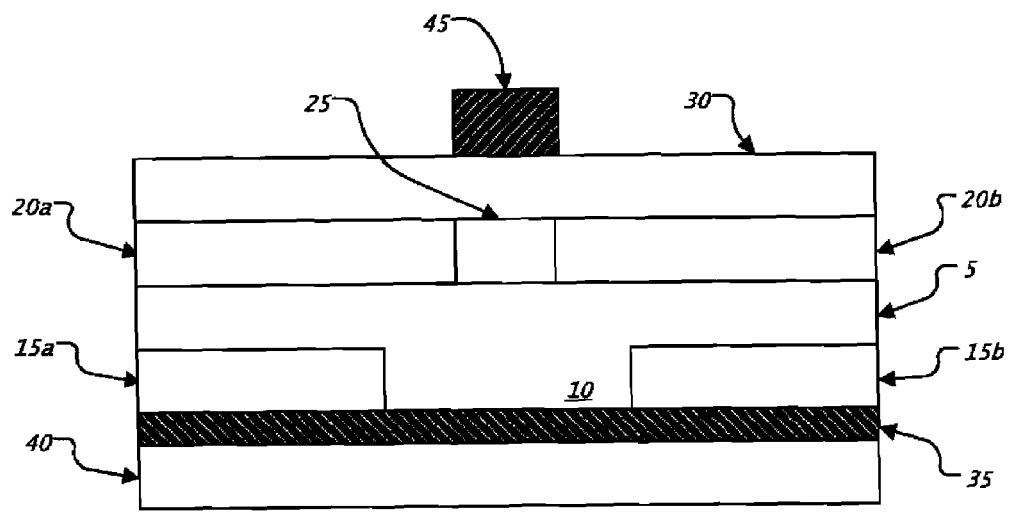
FIG. 2 illustrates a device embodiment.

In another embodiment, referring to FIG. 2, a device further comprises: e) a first electrode 35 underlying the first side clad 15a, the second side clad 15b, and the inverted rib 10; h) a second clad polymer layer 40 underlying the first electrode 35; and i) a second electrode 45 overlying the first clad polymer layer 30 and substantially vertically aligned with the electro-optic channel 25. The second clad polymer layer 40 may be an organically modified silicate. The organically modified silicate comprising the second clad polymer layer 40 may comprise tin and antimony. The first clad polymer layer 30, the first side clad 15a, the second side clad 15b, the third side clad 20a, the fourth side clad 20b, and the electro-optic polymer may be as described above. In another embodiment the second clad polymer layer 40 comprises $SiO_x$. The first electrode 35 and second electrode 45 allow a field to drop across the device (e.g., if the first electrode 35 is "ground" and the second electrode 45 is "hot") that changes the refractive index of the electro-optic polymer channel 25 depending on the voltage. Typically, the first electrode 35 and second electrode 45 are in a microstrip configuration. In many embodiments, the first electrode 35 and second electrode 45 are patterned so that high speed operation (i.e., >1 GHz) of the device is possible. In other embodiments, the first electrode 35 and second electrode 45 may be a lumped circuit.

The thickness of the various device layers will depend on parameters such as the target light wavelength and refractive index of the various polymer materials. Additionally, the refractive index of the various polymer materials may be chosen off the shelf or modified by changing the composition of the polymers to suit various desirable layer thicknesses. The combination of polymer layer thicknesses (for the various clads), waveguide widths and thicknesses, and refractive indices of the materials that result in substantial single mode operation of the device can be modeled and chosen accurately using waveguide modeling software such as FIMMWAVE or BeamPROP. In one embodiment, the second clad polymer layer 40 has a thickness of about 2.0-2.5 microns; the first side clad 15a, the second side clad 15b, and the inverted rib 10 each have a thickness of about 1.5 microns; the passive polymer layer 5 has a thickness of about 1.5 microns; the third side clad 20a, the fourth side clad 20b, and the electro-optic polymer channel 25 each have a thickness of about 1.0 microns; and the first clad polymer layer 30 has a thickness of about 2.0-2.5 microns. In another embodiment, the second clad polymer layer 40 has a refractive index of about 1.50; the first side clad 15a and the second side clad 15b each have a refractive index of about 1.48, and the passive polymer layer 5 and inverted rib 10 have a refractive index of about 1.53; the third side clad 20a and the fourth side clad 20b have a refractive index of about 1.48, the electro-optic polymer channel 25 has a refractive index of about 1.75-1.80 (TM mode) at the wavelength of 1.55 μm; and the first clad polymer layer 30 has a refractive index of about 1.50.

The device may be fabricated by methods known in the art which include spin deposition and curing of the various polymer layers; plasma (i.e., dry) etching of polymer layers, wet etching of polymer layers, and photolithography, etc. For examples of polymer modulator fabrication see: U.S. Pat. No. 6,895,162; M.-C. Oh et al., *IEEE J. Sel. Top. Quant. Electron.* 7(5), 826, 2001; and S.-K. Kim et al., *IEEE Phot. Technol. Lett.* 15(2), 218, 2003.

Figure 3:
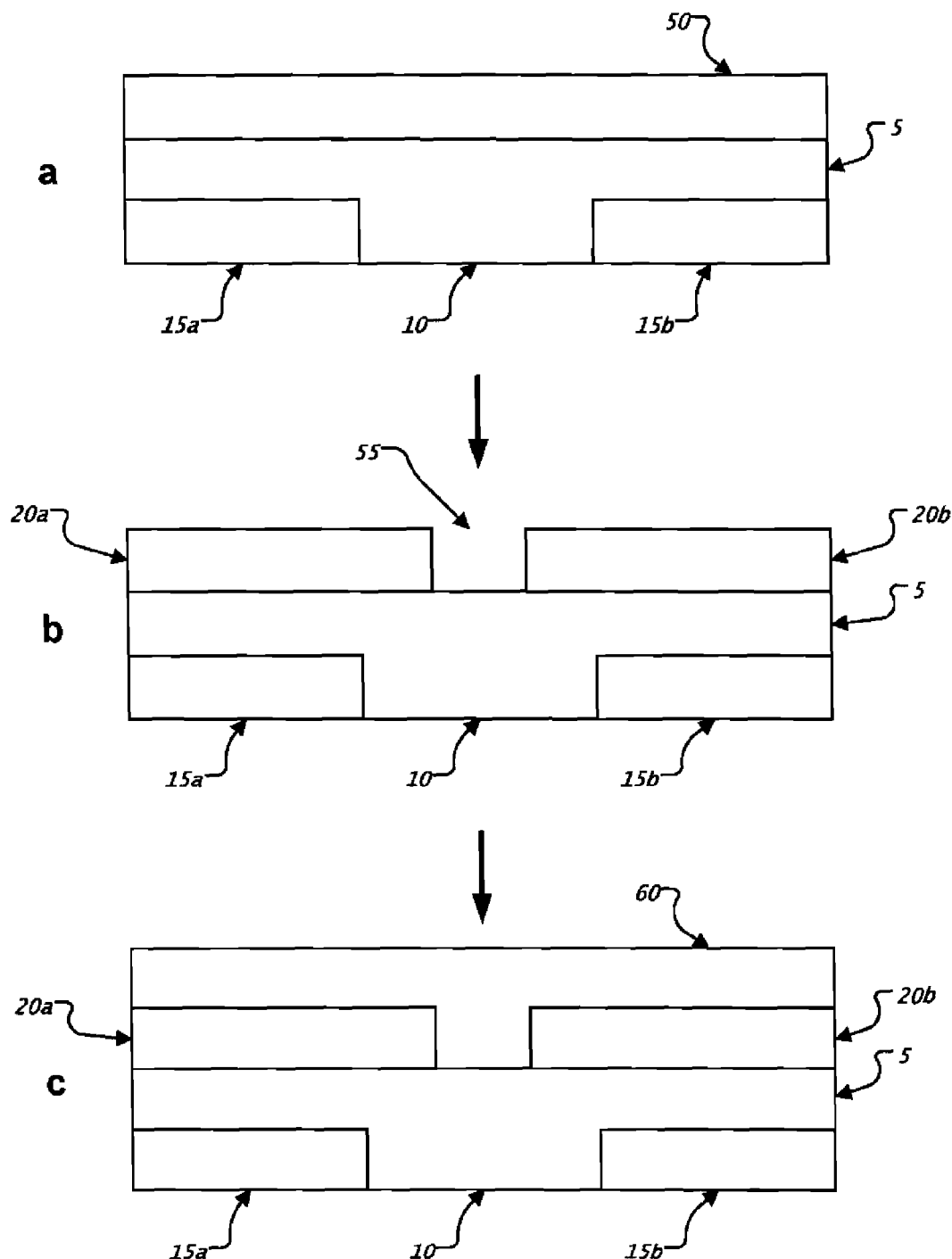
FIG. 3 illustrates a process embodiment.

Referring to FIG. 3, another embodiment is a process comprising: a) (FIG. 3a) providing a passive polymer layer 5 having an inverted-rib 10, a first side clad 15a and a second side clad 15b separated by the inverted rib 10, and a side clad polymer layer 50 overlying the passive polymer layer 5; b) (FIG. 3b) using a plasma, dry-etching a trench 55 into the side clad polymer layer 50 using the passive polymer layer 5 as an etch stop, thereby forming a third side clad 20a and fourth side clad 20b; and c) (FIG. 3c) backfilling the trench 55 with an electro-optic polymer by depositing an electro-optic polymer layer 60 on the third side clad 20a, the passive polymer layer 5, and the fourth side clad 20b. The electro-optic polymer layer 60 may be deposited be any methods known in the art such as, for example, spin deposition, dip-coating, spraying, or brushing, etc. The viscosity of the deposition solvents may be adjusted to completely fill all corners of the trench 55. In some cases, the electro-optic polymer may be deposited in more than one step; this may be done in combination to, for example, backfill all corners of the trench 55, planarize the layer, or adjust the layer thickness. For example, a relatively low viscosity solution of electro-optic polymer may be used to spin deposit and fill all corners of the trench 55 and then a high viscosity solution may be used to spin deposit and increase the thickness. The electro-optic polymer may be as described above. To use the passive polymer layer 5 as an etch stop, the rate at which the side clad polymer is dry-etched with the plasma should be greater than the rate at which the passive polymer layer 5 is etched using the same plasma. Ideally, the passive polymer layer 5 should not dry etch appreciably in the etch gas used to etch the side clad polymer layer 50. For example, a side clad polymer layer 50 comprising a crosslinked organic polymer may be dry etched with oxygen plasma while a passive polymer layer 5 comprising an organically modified silicate would not be etched appreciably using oxygen plasma.

Figure 4:
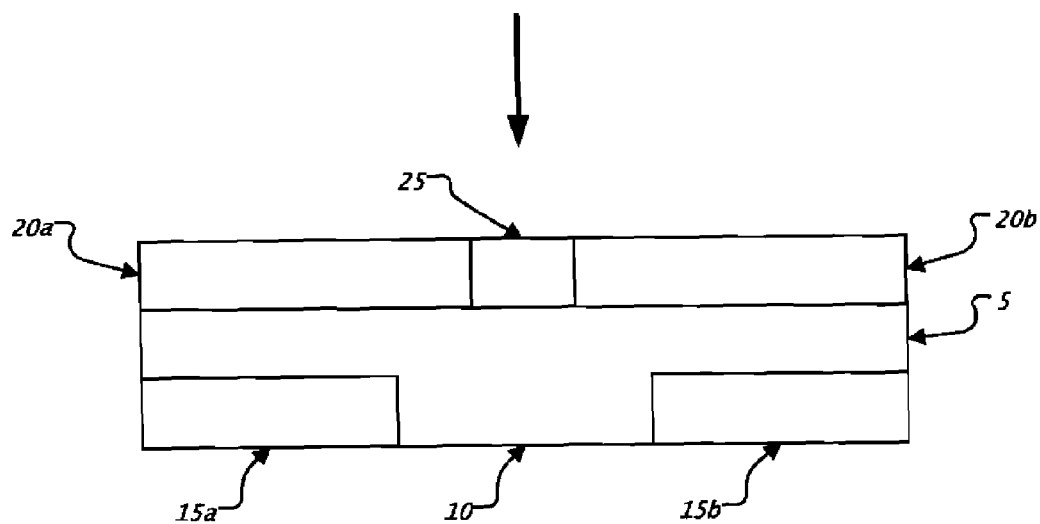
FIG. 4 illustrates a process embodiment.

In another embodiment, referring to FIG. 4, the process further comprises: d) dry-etching the electro-optic polymer layer 60 to form an electro-optic polymer channel 25, wherein the electro-optic polymer channel 25 the third side clad 20a, and the fourth side clad 20b each have about the same thickness.

In many embodiments, the passive polymer layer 5 is an organically modified silicate, the side clad polymer layer 50 is a crosslinked polymer, and the plasma substantially comprises oxygen. The strong silicon-oxygen bonds of the organically modified silicate tend to be more resistant to oxygen dry etching than the organic bonds in the crosslinked polymer; this different reactivity allows the passive polymer layer 5 to be used as an etch stop for the side clad polymer layer 50. In other embodiments, the plasma further comprises helium, neon, or argon. In some embodiments, the plasma does not comprise substantial amounts of fluorine. A substantial amount of fluorine in a plasma may etch an organically modified silicate. The organically modified silicate, the first side clad 15a, the second side clad 15b, the third side clad 20a, and the fourth side clad 20b may be as described above.

Figure 5:
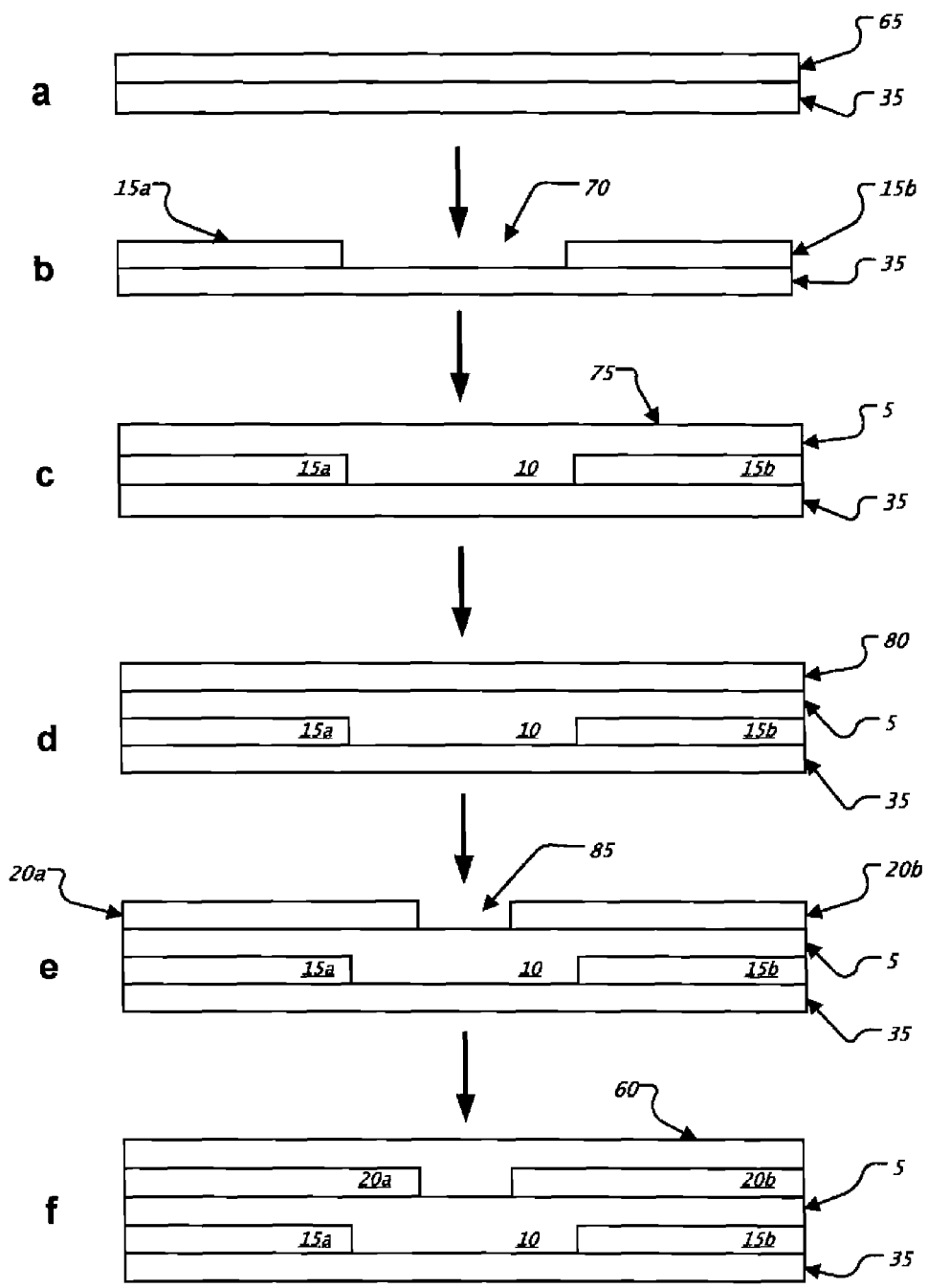
FIG. 5 illustrates a process embodiment.

In another embodiment, referring to FIG. 5, a process comprises: a) providing a first side clad polymer layer 65 and a first electrode 35 underlying the first side clad polymer layer 65; b) using a plasma, dry-etching a first trench 70 into the first side clad polymer layer 65 using the first electrode 35 as an etch stop, thereby forming a first side clad 15a and second side clad 15b; c) backfilling the first trench 70 with a passive polymer by depositing a passive polymer layer 5 on the first side clad 15a, the first electrode 35, and the second side clad 15b, thereby forming an inverted rib 10 between the first side clad 15a and the second side clad 15b, wherein the passive polymer layer 5 has a substantially planar surface 75 opposite the inverted rib 10; d) depositing a second side clad polymer layer 80 on the passive polymer layer 5; e) using a plasma, dry-etching a second trench 85 into the second side clad polymer layer 80 using the passive polymer layer 5 as an etch stop, thereby forming a third side clad 20a and fourth side clad 20b, wherein the second trench is aligned substantially vertically with the inverted rib 10; and c) backfilling the second trench 85 with an electro-optic polymer by depositing an electro-optic polymer layer 60 on the third side clad 20a, the passive polymer layer 5, and the fourth side clad 20b. In some embodiments, the first side clad polymer layer 65 has a thickness of about 1.5 microns; the passive polymer layer 5 has a thickness of about 1.5 microns; and the second side clad polymer layer 80 has a thickness of about 1.0 microns. In another embodiment a second clad polymer layer 40 (not shown in FIG. 5) underlies the first electrode 35. The second clad polymer layer 40 comprises an organically modified silicate. The organically modified silicate comprising the second clad polymer layer 40 may comprise tin and antimony. The second clad polymer layer 40 may also comprise $SiO_x$. The process may further comprise dry etching the electro-optic polymer layer 60 to form an electro-optic polymer channel (e.g., 25 in FIG. 4).

Figure 6:
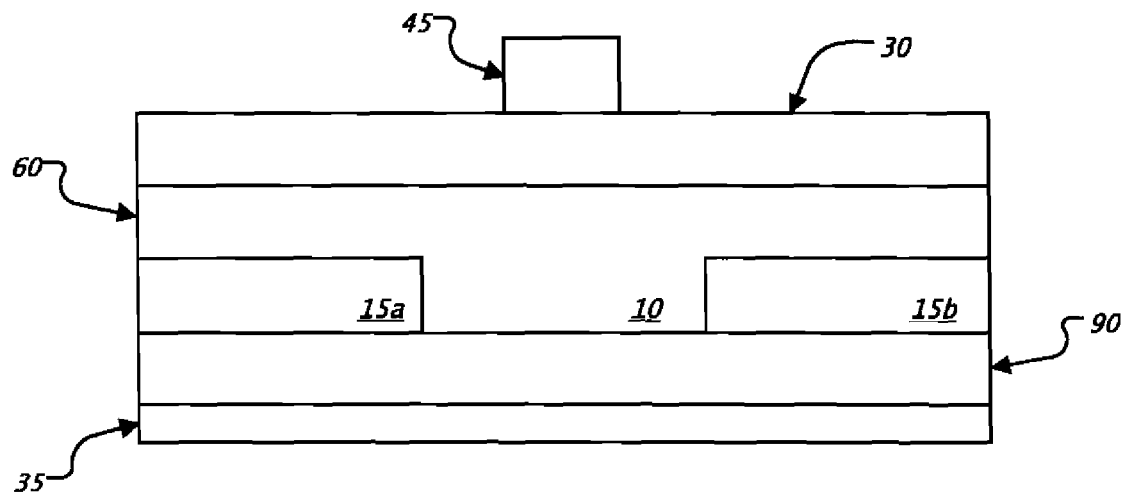
FIG. 6 illustrates a device embodiment.
Figure 7:
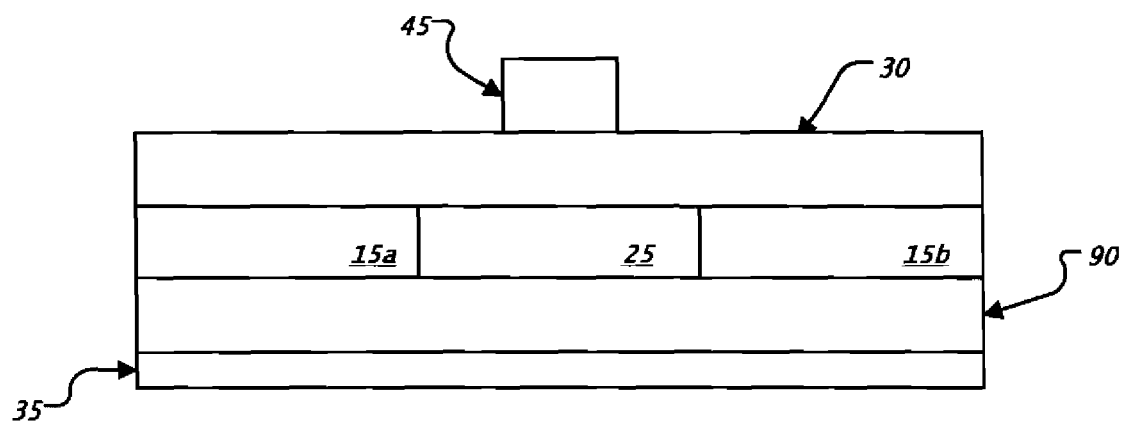
FIG. 7 illustrates a device embodiment.

Referring to FIG. 6, another embodiment is a device comprising: a) a first electrode 35; b) an organically modified silicate clad layer 90 comprising tin and antimony overlying the first electrode 35; c) a first side clad 15a and a second side clad 15b overlying the organically modified silicate clad layer 90; and d) an electro-optic polymer layer 60 having an inverted rib 10 overlying the organically modified silicate clad layer 90, the first side clad 15a, and the second side clad 15b, wherein the first side clad 15a and the second side clad 15b are separated by the inverted rib 10. The organically modified silicate clad layer 90 comprising tin and antimony has a resistivity that is desirably lower compared to the electro-optic polymer, which is important during the electro-optic polymer poling process. In another embodiment, again referring to FIG. 6, the device further comprises: e) a first clad polymer layer 30 overlying the electro-optic polymer layer 60; and f) a second electrode 45 overlying the first clad polymer layer 30. The first side clad 15a, the second side clad 15b, the first clad layer 30, and the electro-optic polymer as well as methods used to fabricate the device may be as those described above. The organically modified silicate clad layer 35 may also be used as an etch stop when an etch process forms the first side clad 15a and the second side clad 15b also as described above. Referring to FIG. 7, another embodiment is device comprising: a) a first electrode 35; b) an organically modified silicate clad layer 90 comprising tin and antimony overlying the first electrode 35; c) a first side clad 15a and a second side clad 15b separated by an electro-optic polymer channel 25, wherein first side clad 15a, second side clad 15b, and electro-optic polymer channel 25, overly organically modified silicate clad layer; and d) a first clad polymer layer 30 overlying the first side clad 15a, second side clad 15b, and the electro-optic polymer channel 25, wherein the electro-optic polymer channel 25, the first side clad 15a, and the second side clad 15b are coplanar with each other and have approximately the same thickness.

Examples

The following example(s) is illustrative and does not limit the Claims. Some commercially available polymers may be used for the various layers of the device. In examples of some embodiments, the following materials were used.

Materials Synthesis

Polymer A

Solution A: A 500 mL round-bottomed flask was charged with 64.20 g (0.36 mol) of methyltriethoxysilane, 84.96 g (0.36 mol) of 3-glycidoxypropyltrimethoxysilane and 84 mL n-butanol. To the mixture 3.60 mL 2M acetic acid aqueous solution and 35.28 mL of distilled water were mixed together and was added dropwise. After the addition the reaction mixture was stirred for 20 minutes at room temperature and the solution was clear. The flask was immersed in a 60° C. oil bath with condenser, nitrogen purge, and magnetic stirring. The reaction was maintained for 15 hours.

Solution B: A 250 mL round-bottomed flask was charged with 61.5 mL of 2,4-pentanedione and 82.20 g (0.20 mol) of tetra-t-butoxytin was added over twenty minutes. Tetra-t-butoxytin was dissolved slowly and the final solution color was orange. The solvation process took about 1.5-2 hours and was exothermic. After the solution cooled down to room temperature, 22.72 gram of antimony III n-butoxide was added dropwise. The solution was capped and kept stirring for 15 hours.

Solution A and B were combined by filtering solution B through a 0.20 µm PTFE filter into solution A with stirring at room temperature. The solution was stirred at room temperature overnight and was ready for thin film processing. Typical thin film process was to spin at 500 rpm for 5 seconds and 2000 rpm for 30 seconds. The spun film was put on a hotplate under nitrogen purge. The material was cured by heating from room temperature to 180° C. in 20 minutes and holding at this temperature for 1 hour. The film thickness was around 2-3 µm depending on the substrate.

Polymer B

A 250 mL round-bottomed flask was charged with 19.68 g (0.08 mol) of 3-(trimethoxysilyl)propyl methacrylate, 17.28 g (0.08 mol) of diphenylsilanediol and 40 mL of THF. The diphenylsilanediol dissolved in THF with magnetic stirring over about 10 minutes and the solution was clear. A total of 0.151 g of barium hydroxide monohydrate was added into the above solution with magnetic stirring. The reaction flask was immersed in a 60° C. oil-bath equipped with a water condenser and heated for 24 hours with stirring. The solution was cooled down to room temperature, filtered through a 0.45 µm PTFE filter, the THF was removed by rotary evaporation to give a transparent, colorless, and viscous solution. With magnetic stirring, 1.61 gram of diphenylmethyl(amino-dimethyl) silane (an endcapper) was added the above solution. The flask was sealed under vacuum for 2 hours with stirring to give a slightly cloudy mixture. The mixture was filtered over a silica-gel column and the THF was removed in vacuum by rotary evaporation. To this resulting materials was added 2-4 wt % of a photoinitiator such as 2-methyl-4'-(methylthio)-2-morpholinopropiophenone, which dissolved quickly. The solution was stored in a refrigerator before application. The film was spin deposited with a thickness of 2-10 μm. The spun film can be cured by a combination of UV light and/or heat. A thinner film can be obtained by solvent dilution.

Polymer C

A total of 12.00 gram of poly(propylene glycol) diacrylate and 8.00 gram of pentaerythritol tetraacrylte, 0.500 gram of 2-methyl-4'-(methylthio)-2-morpholinopropiophenone, and 32 mL of distilled cyclopentanone were charged into a 100 mL round bottom flask and magnetically stirred for 30 minutes to ensure all components were dissolved. The clear, colorless solution was protected from light from while it was not in use. A film was obtained by spin deposition to a thickness of 2-4 μm. The spun film was cured by on a UV conveyer (Fusion UV) at the speed of 3 ft per minute.

Polymer D

The mixture of 4-tert-butylcatechol (66.4 g, 0.4 mol) and ethylene carbonate (71.0 g, 0.8 mol) and a catalytic amount of $Na_2CO_3$ (0.8 g) was heated to 170° C. After the mixture reacted at this temperature for 2 h, the reaction was cooled down to 40° C., and ethyl acetate (200 mL) was added. The product was further purified by silica gel column with ethyl acetate as elute solvent. The yield was 55 g of intermediate. To a solution of the intermediate (45 g, 0.18 mol) and triethylamine (60 mL) in 400 mL dichloromethane, was added 33.0 mL Acryloyl Chloride dropwise at 0° C. After 3 h, the organic salt was filtered out and the product was further purified by silica chromatography with an eluting solvent of hexanes/ ethyl acetate (1/1), to give 60 g of the final product. A photoinitiator was added as for Polymer C above.

Device Fabrication

A solution of Polymer A was spin deposited on a 6 inch, high resistivity silicon wafer and cured to give a 2.5 micron thick second clad polymer layer. A 15 nm adhesion layer of Cr was sputtered onto the second clad polymer layer followed by 1 micron of gold to give the first electrode. Polymer C was spin-deposited (500 rpm/15 seconds, 1000 rpm/15 seconds, and 2000 rpm/130 seconds) and cured on the first electrode to give a 1.5 micron thick first side clad polymer layer. PR-1 1000 A photoresist from Futurrex Inc. was patterned and developed on the first side clad polymer layer to give a Mach-Zehnder modulator pattern. A 4 micron wide first trench was dry etched into the first side clad polymer layer with $O_2$ at 6 mTorr, and the remaining photoresist was stripped. Polymer B was spin deposited to backfill the first trench and cured to give the inverted rib and the passive polymer layer with a substantially planar surface. A solution of Polymer C was spin deposited (500 rpm/5 seconds and 3100 rpm/30 seconds) on the surface of the passive polymer layer to give a 1.0 micron thick second side clad polymer layer. PR-1 1000 A photoresist from Futurrex Inc. was patterned and developed on the second side clad polymer layer to give two 2 micron wide second trenches over each of the Mach-Zehnder arms. The second trenches were dry etched into the second side clad polymer using $O_2$ plasma at 6 mTorr. A crosslinkable electro-optic polymer was spin deposited and soft cured to backfill the second trenches. Polymer D (no solvent added) was spin deposited on the electro-optic polymer layer to planarize the areas above the second trenches. The electro-optic polymer layer/planarization layer was etched back with a 20% $O_2$, 2% $CF_4$, and 20% He plasma to form the electro-optic polymer channel. Polymer C was spin deposited and cured to give a 2.5 micron thick first clad polymer layer. Gold poling electrodes were patterned over the electro-optic polymer channels and the electro-optic polymer was poled and crosslinked with a temperature and voltage ramp. The resulting devices modulated light when a voltage was applied between the gold poling electrodes and the first electrode.

Other embodiments are within the following claims.

The invention claimed is:

1. A process, comprising: a) providing a passive polymer layer having an inverted-rib, a first side clad and a second side clad separated by the inverted rib, and a side clad polymer layer overlying the passive polymer layer; b) using a plasma to dry-etch a trench into the side clad polymer layer using the passive polymer layer as an etch stop, thereby forming a third side clad and fourth side clad; and c) backfilling the trench with an electro-optic polymer by depositing an electro-optic polymer layer on the third side clad, the passive polymer layer, and the fourth side clad.

2. The process of claim 1, further comprising: d) dry-etching the electro-optic polymer layer to form an electro-optic polymer channel, wherein the electro-optic polymer channel the third side clad, and the fourth side clad each have substantially the same thickness.

3. The process of claim 1, wherein the passive polymer layer is an organically modified silicate, the side clad polymer layer is a crosslinked polymer, and the plasma comprises oxygen.

4. The process of claim 3, wherein the plasma further comprises helium, neon, or argon.

5. The process of claim 4, wherein the organically modified silicate comprises an acrylate group and a refractive index modifying group.

6. The process of claim 5, wherein the first side clad, the second side, the third side clad, and the fourth side clad each independently comprises a crosslinked polymer.

7. The process of claim 6, wherein the first side clad, the second side, the third side clad, and the fourth side clad each independently comprises a crosslinked acrylate comprising a poly(alkylene glycol).

8. The process of claim 7, wherein the crosslinked acrylate polymer further comprises pentaerythritol.

9. A process, comprising: a) providing a first side clad polymer layer and a first electrode underlying the first side clad polymer layer; b) using a plasma to dry-etch a first trench into the first side clad polymer layer using the first electrode as an etch stop, thereby forming a first side clad and second side clad; c) backfilling the first trench with a passive polymer by depositing a passive polymer layer on the first side clad, the first electrode, and the second side clad, thereby forming an inverted rib between the first side clad and the second side clad, wherein the passive polymer layer has a substantially planar surface opposite the inverted rib; d) depositing a second side clad polymer layer on the passive polymer layer; e) using a plasma to dry-etch a second trench into the second side clad polymer layer using the passive polymer layer as an etch stop, thereby forming a third side clad and fourth side clad, wherein the second trench is aligned substantially vertically with the inverted rib; and f) backfilling the second trench with an electro-optic polymer by depositing an electro-optic polymer layer on the third side clad, the passive polymer layer, and the fourth side clad.

10. The process of claim 9, wherein: the first side clad polymer layer has a thickness of about 1.5 microns; the passive polymer layer has a thickness of about 1.5 microns; and the second side clad polymer layer has a thickness of about 1.0 microns.

11. The process of claim 9, further comprising: g) dry-etching the electro-optic polymer layer to form an electro-optic polymer channel, wherein the electro-optic polymer channel the third side clad, and the fourth side clad each have substantially the same thickness.

12. The process of claim 9, wherein a second clad polymer layer underlies the first electrode.

13. The process of claim 12, wherein the second clad polymer layer comprises an organically modified silicate.

14. The process of claim 13, wherein the organically modified silicate comprising the second clad polymer layer comprises tin and antimony.

15. The process of claim 12, wherein the second clad polymer layer comprises $SiO_x$.

* * * * *